Oct. 17, 1939.   L. F. CARTER ET AL   2,176,203
STABILIZED MAGNETIC COMPASS
Original Filed Dec. 9, 1937   2 Sheets-Sheet 1
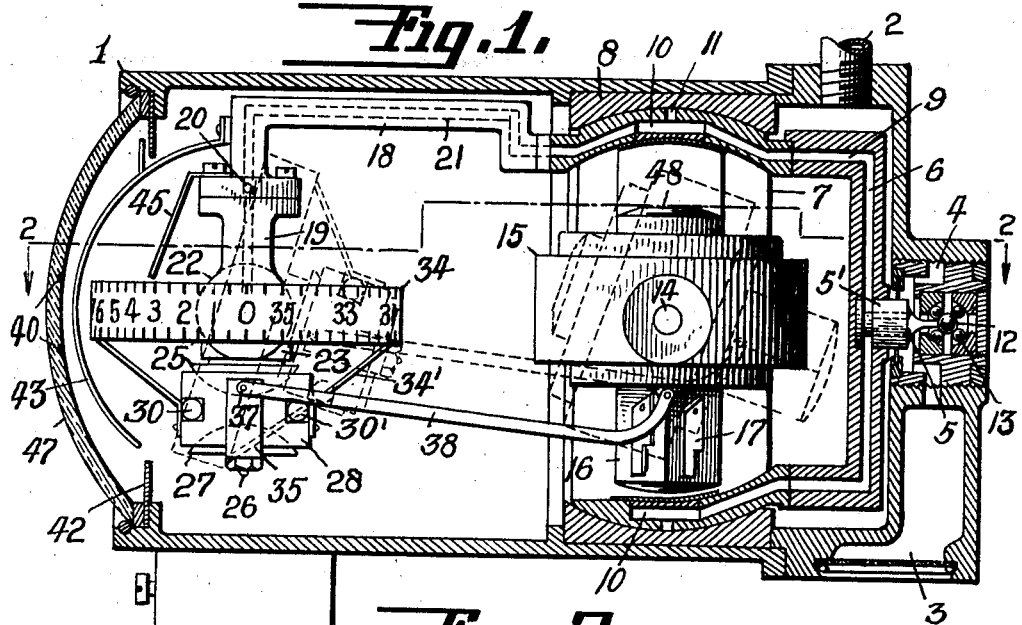
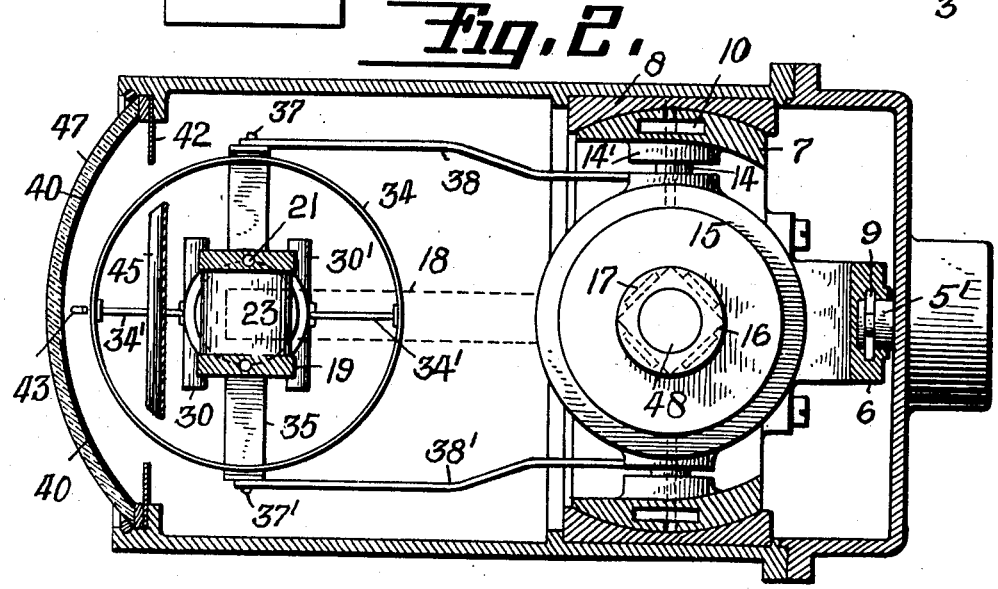
INVENTORS
LESLIE F. CARTER
MORTIMER F. BATES
BY
THEIR ATTORNEY Oct. 17, 1939.   L. F. CARTER ET AL   2,176,203
STABILIZED MAGNETIC COMPASS
Original Filed Dec. 9, 1937   2 Sheets-Sheet 2

INVENTORS
LESLIE F. CARTER
MORTIMER F. BATES
BY
Herbert H. Thompson
THEIR ATTORNEY Patented Oct. 17, 1939

2,176,203

UNITED STATES PATENT OFFICE 2,176,203

STABILIZED MAGNETIC COMPASS

Leslie F. Carter, Leonia, N. J., and Mortimer F. Bates, Brooklyn, N. Y., assignors to Sperry Gyroscope Company, Inc., Brooklyn, N. Y., a corporation of New York Application December 9, 1937, Serial No. 178,974
Renewed March 8, 1939

13 Claims. (Cl. 33—222)

This invention relates to the art of stabilized magnetic compasses. While it has been proposed to stabilize a magnetic compass by mounting the same on a gyro vertical, such devices have not come into use to any extent, largely owing to the fact that the spinning rotor of the gyroscope exerts a torque on the magnetic needle due to the field produced by eddy currents generated by the rotation of the rotor, even where the rotor is made of wholly non-magnetic material, so that the accuracy of the magnetic compass is seriously affected, if not destroyed.

According to the present invention, we overcome the above mentioned defect in the stabilization of magnetic compasses by mounting the magnetic compass at some distance from and preferably to one side of the gyro vertical, so that the eddy current drag is eliminated.

In addition, we have so mounted the magnetic compass and card that it not only indicates direction, i. e., compass bearing, but also the roll and pitch of the craft, since it is stabilized from the gyro vertical, so that the instrument shows the attitude of the craft in all planes and constitutes a complete flight indicator.

A further feature of the invention is a special improvement in the separate arts of gyroscopic verticals or artificial horizons and magnetic compasses by the use of special forms of air flow bearings in connection with the same. Since the mounting of the magnetic compass is stabilized, the magnetic element may be in static balance about its vertical axis.

Other objects and accomplishments of our invention will become apparent from the following description and claims.

Referring to the drawings:

Fig. 1 is a vertical section through our combined stabilized magnetic compass and gyro vertical or artificial horizon.

Fig. 2 is a horizontal section of the same taken approximately on line 2—2 of Fig. 1.

Figure 5:
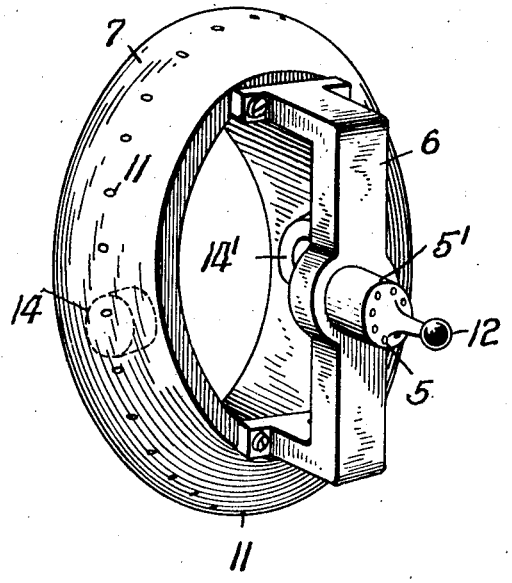
Fig. 5 is a perspective view of the air borne ring used in place of a gimbal ring in the gyro vertical.

Preferably, we mount our stabilized compass within a cylindrical casing 1. The main bearings supporting the same are preferably of the air flow type, and the gyroscope may also be air spun. To supply air for the above purposes, we preferably continuously withdraw air from the casing through pipe 2 by means of a vacuum pump (not shown), the air entering the case through screened passage 3 and through apertures 4 and 5 to pass within the hollow framework or spider 6 connected to a large ring 7 having a curved or convex outer surface (see also Fig. 5), and which serves as a gimbal ring. This surface is completely surrounded by an outer stationary ring 8 having a cooperating interior concave surface, so that ring 7 has a peripheral or circumferential mounting within casing 1. Air flow is continuously supplied between said rings through the passageways 9 through spider 6 and through an interior channel 10 in ring 7, when the air emerges through radial bores 11 to pass outwardly between the cooperating surfaces of the two rings to float the inner ring within the outer ring, thus providing freedom about an axis extending longitudinally or fore and aft in Fig. 1, preferably in line with the axis of pivot pin 5', containing apertures 5. Preferably all three axes of freedom of the gyroscope, i. e., the vertical spin axis 48, horizontal axis 14, and the ring axis, intersect at a common point at the center of gravity of the rotor. The ring is prevented from tipping about any other axis by the anchorage supplied by the pivot pin 5' which preferably has a ball 12 on the end thereof which is engaged on all sides by ball bearings 13, so as to anchor framework 6 to prevent both tipping and longitudinal displacement thereof.

Within the ring 7 is mounted on horizontal trunnions 14 and trunnion bearings 14' the rotor bearing casing 15 of the gyroscope. Said trunnions and bearings may be made hollow, as shown in dotted lines in Fig. 2, to admit air from the annular channel 10 into the casing to spin the gyro, to erect the same, and also to provide air flow for the bearings, if air flow bearings are used. The erection is shown as provided by the usual air ports at the bottom of the extension 16 from the casing, which are differentially covered by pendulous shutters 17, pivoted on said extension.

In front of the gyroscope we mount our special form of magnetic compass. Preferably the compass is secured directly to the ring 7 by means of a hollow extension piece 18 which supports the entire weight of the compass and also supplies air to the air bearings thereof. By this means, also, the compass is mounted for freedom about a fore and aft horizontal axis and is stabilized thereabout by the gyroscope. Said arm is shown as having secured thereto a forked or U-shaped bracket 19 having a channel 20 therein communicating with the channel 21 in arm 18. Said bracket carries at its lower end inwardly facing buttons 22 which form an air bearing supporting the magnetic element for freedom about a transverse horizontal axis in cooperation with a member 23 having cooperating concave surfaces 24. Said member has secured to its under side a downwardly facing button 25 and a pin 26 carrying an upwardly facing button 27, between which the magnetic element proper 28 is borne by the air bearings formed between said buttons and the concave surfaces 29 in the element 28.

Said element is shown as carrying a pair of magnets 30, 30′, one on each side of the center pin 26. Air passes downwardly through the channels 20 and through bores in buttons 22, where a part of the air emerges laterally to form the air flow horizontal bearings between buttons 22 and part 23, about which axis part 23 is stabilized from the gyroscope. The remainder of the air passes downwardly through channel 31 through the sleeve 32 and outwardly through holes 33 at the bottom thereof, to thence pass outwardly through the air flow vertical bearings between buttons 25 and 27 and part 28, said sleeve being formed at its lower end at the aforesaid threaded pin 26.

The magnetic element 28 is shown as carrying a compass card 34 of cylindrical form through spider arms 34′. To the lower button 27 is also secured a U-shaped bracket 35, said bracket being connected by pivots 37, 37′ and links 38, 38′ to the extension 16 from the rotor bearing case 15, so that the compass is given the long period of the gyroscope or, in other words, is substantially stabilized about both major horizontal axes. The weight of the entire magnetic compass is preferably balanced by the weight of spider 6 and stud 5′ so that no bending strain is placed on stud 5′ and bearing 12—13. Also the compass is balanced about horizontal bearings 22, 23 by adjustable weight 46 and is statically balanced about its vertical axis and need not be made heavy on the south end, as is usual, since it has a fixed, stabilized vertical axis.

The dotted line position in Fig. 1 shows the position assumed by the parts in case the airplane is diving downwardly at a steep angle, and shows that the device is capable of operation through large angles of inclination.

Figure 3:
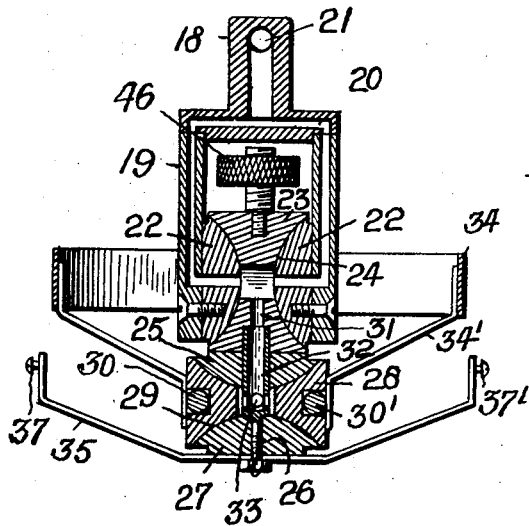
Fig. 3 is a vertical section through the magnetic compass element of the device, taken in a plane at right angles to Fig. 1, with, however, the compass unit turned to lie in the same plane as Fig. 1.
Figure 4:
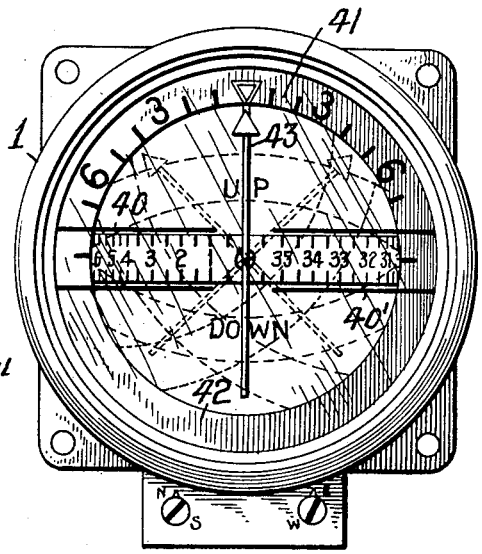
Fig. 4 is a face view of the combined indicator of our invention.

The face of the instrument may be marked as shown in Fig. 4, so that the device shows not only compass bearings but roll and pitch of the craft. To this end, the face is provided with horizontal markings 40, 40′, preferably on the curved glass window 47, which are read in connection with the up and down position of the compass card to indicate pitch. For indicating the roll, the casing may be provided with circular graduations 41 on the bezel ring 42, which are read in connection with a pointer 43 secured to the arm 18, and which therefore show roll only. The dotted line positions of the pointer show the readings when the craft is rolled about 45° in both directions. The compass card is also read on the shank or stem of the pointer 43 so that the readings are correct even when the craft is rolled at a steep angle, since the card and shaft 43 always roll through the same angle and the shaft 43 remains perpendicular to the card. A shield 45 may be secured to arm 18 to obscure the parts behind the pointer 43, if desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a stabilized magnetic compass, an outer casing, a universally mounted gyro vertical therein having its gimbal ring in the form of a vertical ring having a peripheral mounting in said casing giving freedom about the axis of said ring, and a rotor bearing casing pivotally mounted in said ring on a normally horizontal axis perpendicular to said other axis, a magnetic compass secured to and stabilized by said ring about said first axis, and pivoted thereon about a horizontal axis parallel to and to one side of said second axis, and a coupling between said compass and bearing casing to stabilize the compass about its said horizontal axis.

2. A flight indicator for aircraft comprising a laterally spaced, universally mounted gyro vertical and magnetic compass, means connecting said gyroscope and compass to stabilize the latter about both horizontal axes, a cylindrical card on said compass, a front window through which said card is visible, and indices adjacent thereto showing the attitude of the craft in all planes when read in conjunction with said card.

3. A gyro-stabilized magnetic compass as claimed in claim 1, wherein the peripheral mounting of the vertical ring in the casing is in the form of an air flow bearing, and an anchor bearing is provided on the side thereof opposite to the magnetic compass.

4. A stabilized magnetic compass as claimed in claim 2, wherein said universal mounting of said magnetic compass is provided by air flow bearings.

5. In an air borne gyroscope, a rotor, a casing in which said rotor is journalled for spinning about an axis, a ring within which said casing is mounted for oscillation about an axis at right angles to the rotor spin axis, an outer housing, said ring and housing having complementary interfitting curved surfaces extending circumferentially around said ring, and means for supplying air flow between said surfaces to float said ring within said casing and provide freedom about a second horizontal axis.

6. A gyroscopic artificial horizon for aircraft comprising a rotor, a rotor bearing casing in which said rotor is mounted for spinning about a normally vertical axis, a normally vertical ring surrounding said casing and pivotally supporting the same for oscillation about a horizontal axis in the plane of said ring, and an outer casing, said ring and outer casing having complementary interfitting curved surfaces extending circumferentially around said ring, to provide freedom about the axis of said ring, all three axes intersecting in a common point at the center of the rotor.

7. An air borne magnetic compass comprising a balanced magnetic element, a supporting member therefor, upper and lower air flow bearings pivotally mounting said element in said member about a vertical axis, a frame for supporting said member, air bearings pivotally mounting said member in said frame about a horizontal axis, an outer casing, an air bearing pivotally mounting said frame in said casing about a second horizontal axis, and means for giving said compass a long period of oscillation about said two horizontal axes.

8. A gyro stabilized magnetic compass comprising a laterally spaced universally mounted gyro-vertical and magnetic compass, an arm extending laterally from a part of said gyro-vertical for supporting said magnetic compass and stabilizing it about a horizontal axis, linkage connecting another part of said gyro-vertical and said magnetic compass to stabilize it about a second horizontal axis, and a compass card mounted on said magnetic compass and stabilized about both said horizontal axes.

9. A flight indicator for aircraft comprising a laterally spaced, universally mounted gyro-vertical and magnetic compass, means connecting said gyroscope and compass to stabilize the latter about both horizontal axes, a card on said compass, a window through which said card is visible, and indices adjacent thereto showing the attitude of the craft in all planes when read in conjunction with said card.

10. A flight indicator for aircraft, including a gyroscopic artificial horizon as claimed in claim 6 and a laterally spaced magnetic compass supported by and stabilized in both planes therefrom.

11. A gyroscopic artificial horizon for aircraft as claimed in claim 6, having an anchor bearing between said outer casing and said vertical ring in line with the axis of the ring.

12. In an air borne gyroscope, a rotor, a casing in which said rotor is journalled for spinning about an axis, a ring within which said casing is mounted for oscillation about an axis at right angles to the rotor spin axis, an outer housing, said ring and housing having complementary interfitting curved surfaces extending circumferentially around said ring, an anchor bearing between said ring and outer casing in line with said second named axis, and means for supplying air therethrough to within said ring, from which it escapes between said complementary interfitting curved surfaces to air-float the ring within the housing.

13. In a stabilized magnetic compass, an outer casing, a universally mounted gyro vertical therein having its gimbal ring in the form of a vertical ring having a peripheral air-borne mounting in said casing giving freedom about the axis of said ring, a rotor bearing casing pivotally mounted in said ring on a normally horizontal axis perpendicular to said other axis, a magnetic compass secured to and stabilized by said ring about said first axis, air-borne bearings pivotally mounting said compass on said ring about a horizontal axis parallel to and to one side of said second axis, a coupling between said compass and bearing casing to stabilize the compass about its said horizontal axis, and an anchor bearing between said outer casing and gimbal ring lying in the axis thereof, said bearing and ring being hollow whereby air is supplied to the air-borne bearings of both said ring and said magnetic compass.

LESLIE F. CARTER.
MORTIMER F. BATES.